March 17, 1970     H. C. ROWLAND     3,501,364
PLASTIC BOW AND METHOD OF MAKING THE SAME
Filed July 18, 1966

INVENTOR
Homer C. Rowland

BY *Hovey, Schmidt, Johnson & Hovey*
ATTORNEYS

3,501,364
PLASTIC BOW AND METHOD OF MAKING THE SAME

Homer C. Rowland, Lawrence, Kans., assignor to Hallmark Cards Incorporated, Kansas City, Mo., a corporation of Missouri
Filed July 18, 1966, Ser. No. 565,948
Int. Cl. D04d 7/10; B32b 1/04, 31/04
U.S. Cl. 161—10                             2 Claims

ABSTRACT OF THE DISCLOSURE

A decorative bow made from a plurality of strips of synthetic resin material, the strips being rebent upon themselves and fused together by the application of heat and pressure to form a pair of opposed loops, the looped, fused strips being arranged with a common junction and fused together at the junction by the application of pressure and heat to form the finished bow.

---

This invention relates to a decorative bow and also to a novel method for constructing and securing a bow in a desired configuration.

It is the primary object of the present invention to provide a decorative bow fabricated from synthetic resin ribbon wherein loops formed therein are secured by heat sealing to present a neat appearing, aesthetically pleasing bow free of knots, ties and other connections where unsightly deformation is present at the junction points of the loops.

It is an important object of this invention to provide a decorative bow having heat-sealed loops as above described whereby an effective fused bond is formed at the junction of the loops to protect against accidental separation of the loops such as heretofore experienced with the unintentional untying of knotted bows and inadvertent breaking of the adhesive bond of bows secured by impregnated moisture activated material.

Another object of the instant invention is to provide a method for making a decorative bow of the aforementioned character wherein the bow is fabricated by a novel sequence of process steps to present a neat appearing, decorative packaging article. Furthermore, the sequence of the steps lends itself to time-saving, economical mass production and requires only minimal manual labor. The method is particularly adapted for use with modern synthetic ribbon materials which are presently used for most decorative packaging.

Other objects will become apparent from the following specification and accompanying drawing, wherein.

The ribbon used in forming the bow of the present invention is made from a synthetic resin material which is adapted for heat sealing so that portions of the ribbon may be superimposed and fused together to form loops in the ribbon. Various synthetic resin ribbons are presently available and would be suitable for forming bows under the teachings of the instant invention. For example, ribbons formed from adhesively joined strands or extruded polyethylene could be successfully employed.

Figure 1:
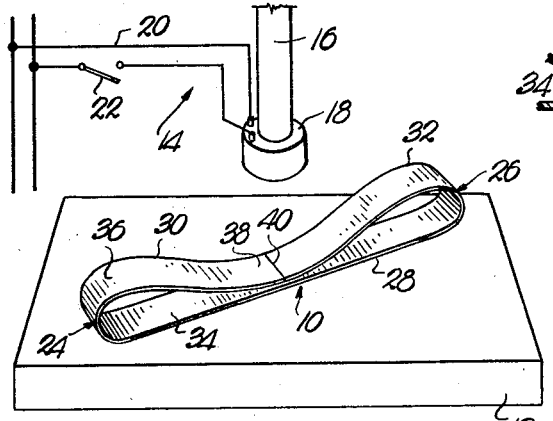
FIGURE 1 is a perspective view of a strip of ribbon showing the initial steps of lapping and supporting the same in preparation for heat sealing to form a section of a bow.

Referring to FIG. 1, an initially flat, elongated strip 10 of ribbon is supported on a plate 12 beneath heat-sealing apparatus 14. Apparatus 14 includes a reciprocable plunger 16 having a cylindrical heating element 18 at its lowermost end, the latter being connected to electrical circuitry 20 which operates to raise the temperature of element 18 when a switch 22 of the cirhcuitry is closed.

Strip 10 is lapped or rebent upon itself to present a pair of opposed loops 24 and 26 having a common lower leg portion 28, and respective upper leg portions 30 and 32. Each loop 24 and 26 has a first face 34 and a second face 36, with opposed end portions of first face 34 being in face-to-face engagement to present a common junction 38 at approximately the center of strip 10.

The free ends 40 of upper legs 30 and 32 may be in contact as shown in FIG. 1, or spaced apart at any desired predetermined distance to adjust the size of loops 24 and 26. When ends 40 are spaced apart, junction 38 will, of course, extend over a wider zone than that illustrated.

Figure 2:
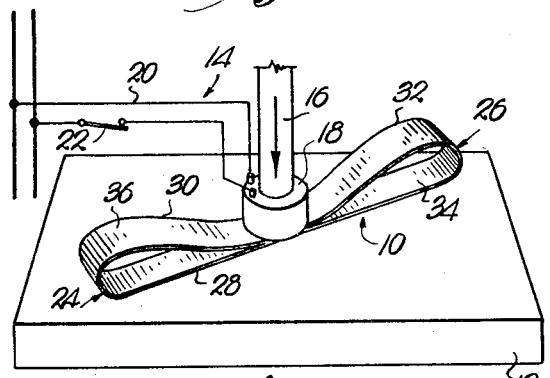
FIG. 2 is a view similar to FIG. 1 showing the application of heat to the bow section.

After the supported strip 10 is lapped into the desired configuration, the opposed portions of first faces 34 are maintained in contact and plunger 16 is shifted downwardly into engagement with junction 38. Switch 22 is closed so that heat is applied to junction 38 through element 18 as the latter simultaneously applies pressure to the junction (FIG. 2). Sufficient heat and pressure are applied by element 18 to fuse upper leg portions 30 and 32 to lower leg portion 28 and thereby form an integral bond at junction 38 as is clear from viewing FIG. 4. Heating element 18 is then retracted by plunger 16 to present the completed bow section 42 illustrated in FIG. 3.

Figure 3:
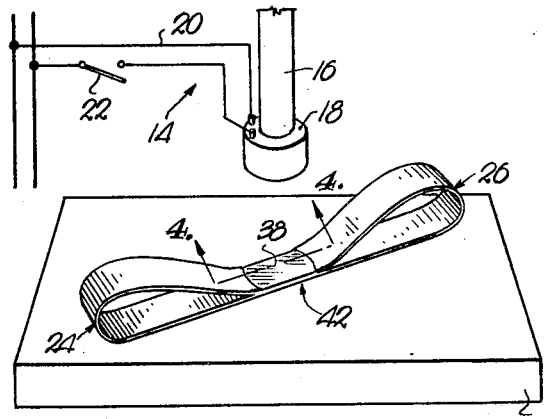
FIG. 3 is a view similar to FIGS. 1 and 2 showing a heat-sealed bow section.
Figure 4:
FIG. 4 is a cross-sectional view taken along line 4—4 of FIG. 3.
Figure 5:
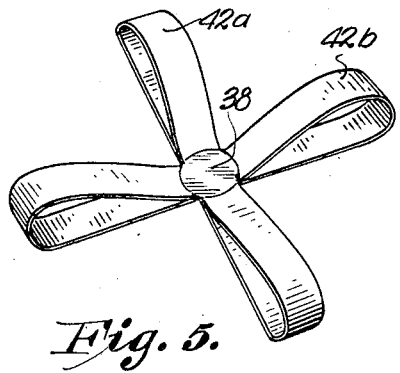
FIG. 5 is a perspective view showing a pair of the sections heat sealed together.
Figure 6:
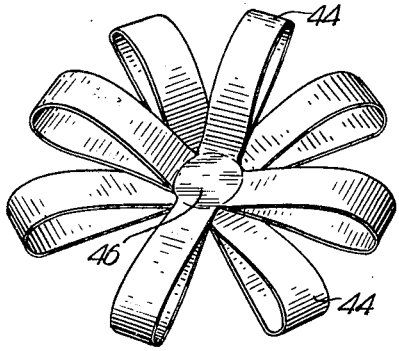
FIG. 6 is a perspective view of a completed bow having a number of sections heat sealed together.

Bow sections 42 may be arranged in any desired decorative pattern. For example, in FIG. 5, sections 42a and 42b are arranged in a cross pattern with the junctions 38 thereof heated and pressed in stacked relationship with the junctions fused to effect a seal. Each section of the bow may be individually formed as illustrated in FIGS. 1-3, or may be lapped and superimposed with like sections prior to the heat-sealing operation, whereby only a single heat-sealing step is required for completing the entire bow. In FIG. 6, a pair of cross patterns are superimposed and relatively offset to present a plurality of secured loops 44 radiating from the center 46 of the bow.

The source of heat and pressure for fusing the secured portions of the bow may be of any suitable size and configuration. For example, an individual utilizing the method of the present invention may readily use the tip of a household iron to secure the loops of the bow, whereas a manufacturer may employ a mass production assembly with a reciprocating plunger such as illustrated in the drawing. The source of the heat may be electrical as illustrated, as well as other suitable means such as an ultrasonic method, wherein high frequency sound is utilized to acoustically heat seal the ribbon. In any event, the sequence of steps illustrated in FIGS. 1-3 is quickly performed and the completed bow is secured by a very strong bond which will not inadvertently be broken apart. Also, the bow is aesthetically pleasing since no substantial deformation is present in the ribbon as there is in knotted bows.

Having thus described the invention, what is claimed as new and desired to be secured by Letters Patent is:

1. A method for making a decorative bow comprising the steps of:
   supporting a strip of synthetic resin ribbon;

lapping said strip to bring opposed portions thereof into contact at a junction to form a loop;
applying heat to the junction of said portions while maintaining the latter in contact, said heat being sufficient to fuse said portions,
removing the heat from the junction after said portions have fused to each other to secure the loop;
arranging a plurality of said loops in a decorative pattern with the junctions thereof in stacked relationship;
applying heat to the stack of junctions while maintaining the latter in contact, said heat being sufficient to fuse said junctions; and
removing the heat from the stack after said junctions have fused to each other to secure the bow.

2. A decorative bow comprising:
a plurality of loops each formed from an initially flat, elongated strip of synthetic resin material, each strip being rebent upon itself to present a pair of opposed loops having a common lower leg portion and an upper leg portion for each loop, the upper leg of each said loop being fused to its lower leg by the application of pressure and heat to said legs, said plurality of looped, fused strips being arranged in a decorative pattern, the loops being in contact at a common junction and fused together at said junction by the application of pressure and heat.

References Cited

UNITED STATES PATENTS

| | | | |
|---|---|---|---|
| 2,886,912 | 5/1959 | Rowland | 161—10 |
| 2,910,794 | 11/1959 | Lockridge | 161—9 |

JACOB H. STEINBERG, Primary Examiner

U.S. Cl. X.R.

2—244; 156—272; 223—46